United States Patent [19]

Lehrach

[11] Patent Number: 4,529,165

[45] Date of Patent: Jul. 16, 1985

[54] SOLENOID VALVE

[75] Inventor: Ronald P. C. Lehrach, Glastonbury, Conn.

[73] Assignee: United Technologies Diesel Systems, Inc., Springfield, Mass.

[21] Appl. No.: 640,639

[22] Filed: Aug. 14, 1984

[51] Int. Cl.[3] ........................ F16K 31/06; F16K 25/02

[52] U.S. Cl. .................................... 251/139; 251/141; 251/333; 137/469

[58] Field of Search ............... 251/129, 333, 139, 141; 137/469

[56] References Cited

U.S. PATENT DOCUMENTS

| | | | |
|---|---|---|---|
| 3,054,420 | 9/1962 | Williams | 137/469 |
| 3,285,285 | 11/1966 | Bielefeld | 251/139 X |
| 3,448,960 | 6/1969 | Medley | 251/129 |
| 3,588,039 | 6/1971 | Chelminski | 251/141 |

*Primary Examiner*—Arnold Rosenthal
*Attorney, Agent, or Firm*—Stephen A. Schneeberger

[57] ABSTRACT

A normally-open, solenoid-controlled valve includes a stationary valve-seat spindle and a cylindrical valve sleeve encircling and slideable along part of the valve-seat spindle. The valve-seat spindle has an annular control edge and the valve sleeve includes a pressure-responsive surface which is reciprocably moved into and out of valve-closing contact with the control edge. The valve-seat spindle includes a flow passage therein extending to and discharging into a plenum region formed radially inward of the control edge between the spindle and the sleeve. The pressure-responsive surface of the valve sleeve is a substantially continuous frustrum of a cone whose apex extends in the direction of the valve opening and which extends radially outward from a sleeve inner diameter A to an outer diameter C (point C) of discontinuity in that surface. Point C is radially outward of the spindle and sleeve centerline at least as far as the point of intersection, B', with that frustoconical pressure-responsive surface of a line normal to the surface and extending through the control edge D when the sleeve is fully-open. The minimum radial positioning of discontinuity point C is a function of the angle of the pressure-responsive surface and the stroke of the sleeve. The high pressure plenum is structured to enhance the valve-opening rate.

9 Claims, 5 Drawing Figures

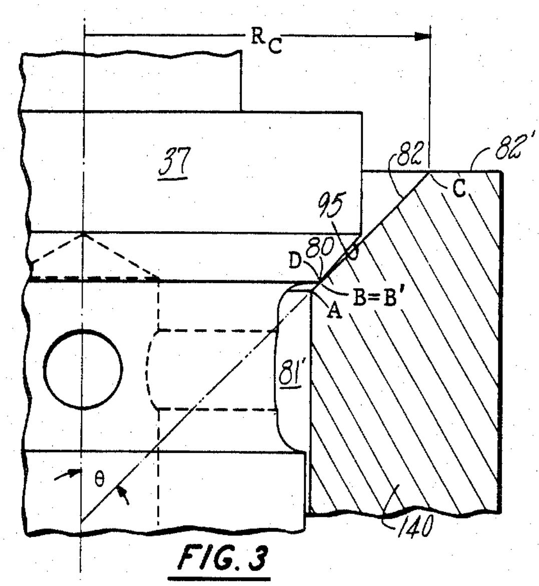
FIG. 3
FIG. 5
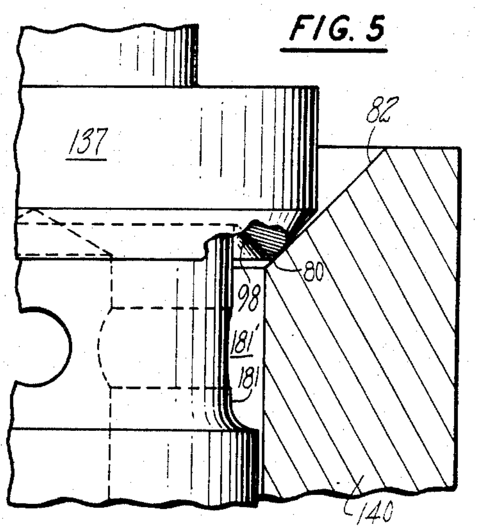
FIG. 4
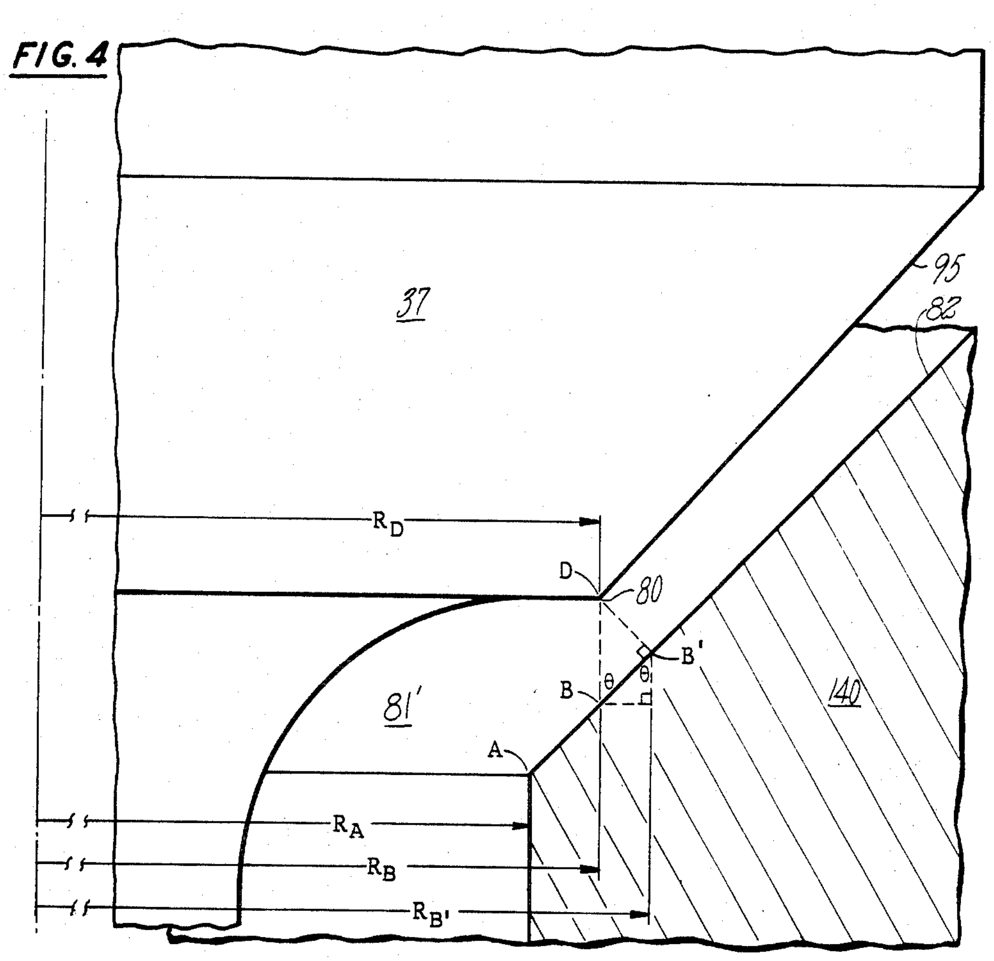

SOLENOID VALVE

DESCRIPTION

1. Technical Field

The invention relates to a liquid flow valve and more particularly to a solenoid-controlled valve. More particularly still, the invention is concerned with improvements in the hydromechanical characteristics of solenoid-controlled valves.

2. Background Art

Solenoid-controlled valves have long been used for regulating the flow of liquids, as in various water delivery systems and more recently in fuel delivery systems for automotive application. In this latter regard, solenoid-controlled valves have been used to directly control the admission of gasoline to spark-ignited engines and, more recently, consideration has been given to their use for indirectly controlling the admission of fuel to compression-ignition (i.e., diesel) engines. Examples of such latter solenoid-controlled valves may be found in U.S. Pat. No. 3,851,635 to Murtin et al and in U.S. Pat. No. 4,258,674 to Wolff. Examples of other patents disclosing solenoid-controlled valves, either of a type gor controlling fuel to an internal combustion engine or for general use in controlling liquid flow include U.S. Pat. Nos. 4,394,962; 4,392,612; 4,299,252; and 4,076,045.

In the aforementioned patents, the solenoid valve is provided with a mechanical biasing element, such as a biasing spring to facilitate positive return of the valve to its normal or rest position (open or closed) when the solenoid is de-energized. Where the valve serves a bypass function, as for instance in certain of the aforementioned automotive applications, its rapid opening is important to achieving an abrupt termination of fuel injection which in turn is required by constraints on exhaust emissions. However, such biasing springs contribute to the volume and complexity of a solenoid control valve and additionally contribute to the load or force which the solenoid must overcome in actuating the valve.

Copending applications U.S. Pat. No. 640,640 entitled "Fuel Delivery Control System" and U.S. Ser. No. 640,648 entitled "Solenoid Valve, Particularly As Bypass Valve With Fuel Injector", both filed on even date herewith by Thomas J. Wich and assigned to the same assignee as herein, disclose a fuel delivery control system and a solenoid-controlled bypass valve particularly structured and positioned for cooperate association with a fuel injector to afford a rapid response to control signals for effecting requisite fuel delivery.

DISCLOSURE OF INVENTION

Accordingly, it is an object of the present invention to provide a solenoid-controlled valve, particularly of a type which does not rely upon mechanical bising means, for rapidly opening in response to hydraulic pressure. Included within this object is the provision of such valve, in a normally-open configuration, for use as a bypass in combination with a pressure-responsive fuel injector.

It is a further object of the present invention to provide a solenoid-controlled valve of a type in which a portion of valve actuation is effected in response to hydraulic pressure on a surface thereof and in which that surface is structured to ensure and enhance rapid response.

In accordance with the present invention there is provided a valve for controlling the flow of liquid between a high pressure supply and a relatively lower pressure drain. The valve includes, within a housing, a stationary valve-seat spindle and a cylindrical valve sleeve encircling and slideable along part of the valve-seat spindle. The valve-seat spindle is provided with an annular control edge and the valve sleeve includes a pressure-responsive surface which is moved into and out of valve-closing contact with the control edge by means of axial reciprocation of the valve sleeve between valve-closed and valve-open positions. An armature is operatively connected to the valve sleeve and a solenoid coil is positioned to provide valve-closing actuation of the armature and valve sleeve when an electrical current is applied to the coil.

The valve-seat spindle includes a flow passage therein which is in continuous fluid communication with a high pressure fluid inlet in the valve housing. That flow passage extends to and discharges into, a plenum region formed radially inward of the control edge between the spindle and the sleeve. When the valve is open, liquid flows from the plenum region past the control edge and out of the valve housing at a drain outlet. Energization of the solenoid coil closes the valve and prevents liquid flow. When the solenoid is de-energized, the pressure of the high pressure liquid in the plenum acts axially on the pressure-responsive surface of the valve sleeve to rapidly open the valve and allow flow of the liquid to resume. The simplicity of the valve is enhanced by the absence of a biasing spring and is rapid response rate, particularly throughout the "valve-opening" phase, is attained by a particular structuring of the pressure-responsive surface of the sleeve.

The valve-seat spindle is fixed in a stationary position and includes a first axial portion of one diameter and about which the valve sleeve closely slides. The annular control edge is of greater diameter and is thus formed in a portion of the valve-seat spindle which is of greater diameter. The flow passage in the valve-seat spindle is provided by an axial bore intersected by one or more radial bores which in turn discharge to the plenum. The pressure-responsive surface of the valve sleeve is a substantially continuous frustrum of a cone whose apex extends in the direction of valve opening and which extends radially outward from an inner diameter A of the sleeve (represented by point A) to an outer diameter C (represented by point C) corresponding to a discontinuity in that surface. The point C is radially outward of the centerline of the spindle and sleeve at least as far as the point of intersection, B′, with that frustoconical pressure-responsive surface of a line normal to the surface and extending through the control edge D when the sleeve is in its fully-open position. Thus the minimum radial positioning of discontinuity point C will be a function of both the angle of the pressure-responsive surface and the stroke of the sleeve.

The valve is especially suited for use as a bypass valve in combination with a high pressure fuel injector nozzle of the pressure-responsive type. Rapid opening of the valve serves to abruptly terminate fuel injection for control of exhaust emissions.

Further enhancement of the rate of valve opening is obtained by structuring the high pressure plenum such that there is relatively little pressure drop upstream of the control edge, with an abrupt drop in pressure occurring in the annular orifice formed between the control edge and the pressure-responsive surface.

BRIEF DESCRIPTION OF THE DRAWING

FIG. 3 is a further enlarged partial view of the valve of FIG. 2 in its closed position;

FIG. 4 is a still further enlarged partial view of FIG. 3 showing the valve in an open position and illustrating geometrical constraints on the pressure-responsive surface in accordance with the invention; and FIG. 5 is a partial view of another embodiment of the valve, similar to FIG. 3 and illustrating an alternative configuration for the high pressure plenum.

BEST MODE FOR CARRYING OUT THE INVENTION

Figure 1:
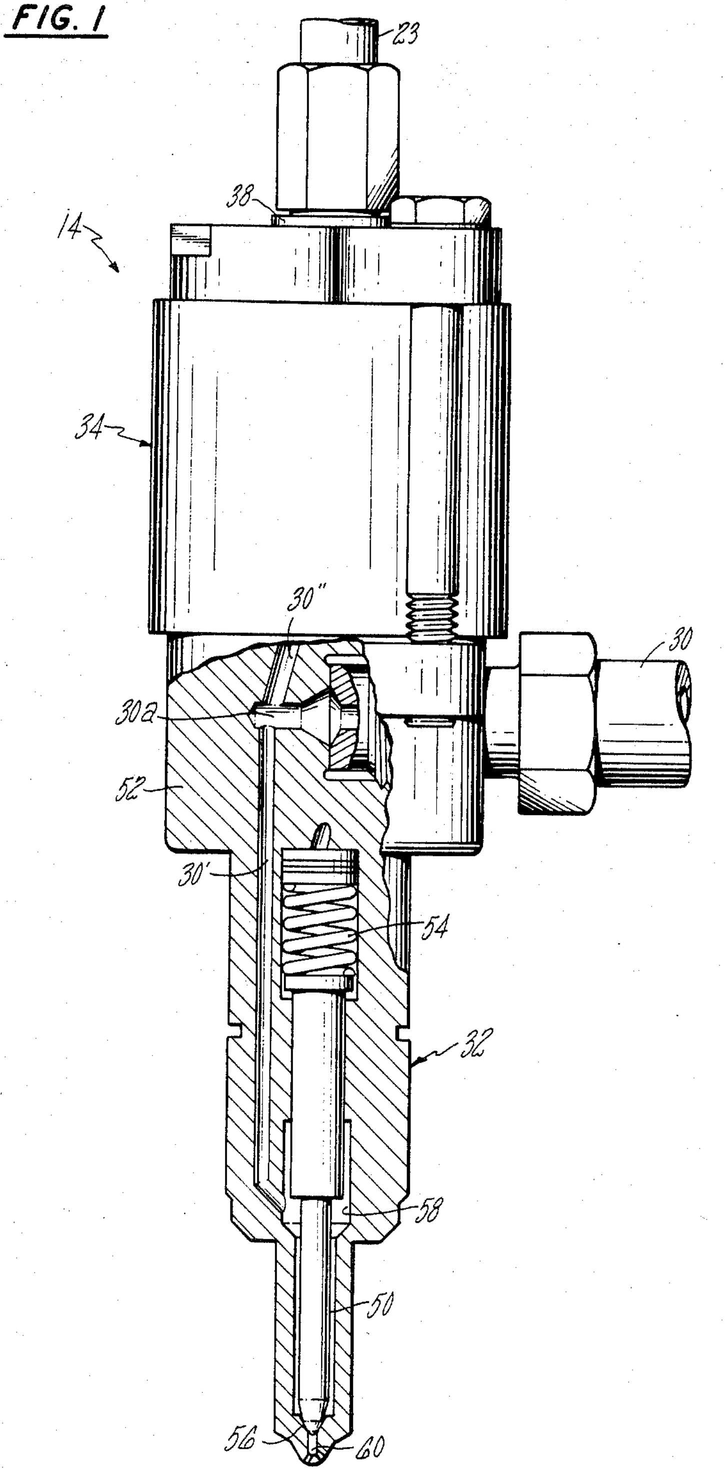
FIG. 1 is a sectional view of a fuel injector valve which includes a solenoid-actuated bypass valve constructed in accordance with the present invention.

Referring to FIG. 1, there is illustrated a combined bypass valve and injector assembly 14 generally as disclosed in the aforementioned application Ser. Nos. 640,640 and 640,648 of Thomas J. Wich. The assembly 14 includes an injector nozzle 32 and a bypass valve 34. A conduit 30 delivers fuel at relatively high pressure, i.e., several thousand psi, to the assembly 14. Conduit 30 branches at node $30_a$ within nozzle body 52 to provide a pair of conduit extensions 30' and 30". Conduit extension 30' extends to a valve chamber 58 in which there is located an injector valve 50. Injector valve 50 is biased by spring 54 into valve-closing engagement with a valve seat 56. When the fuel pressure within chamber 58 is sufficient to overcome the biasing force of spring 54, the needle 50 lifts from seat 56 in a known manner to inject fuel into an engine via nozzle orifice 60.

Figure 2:
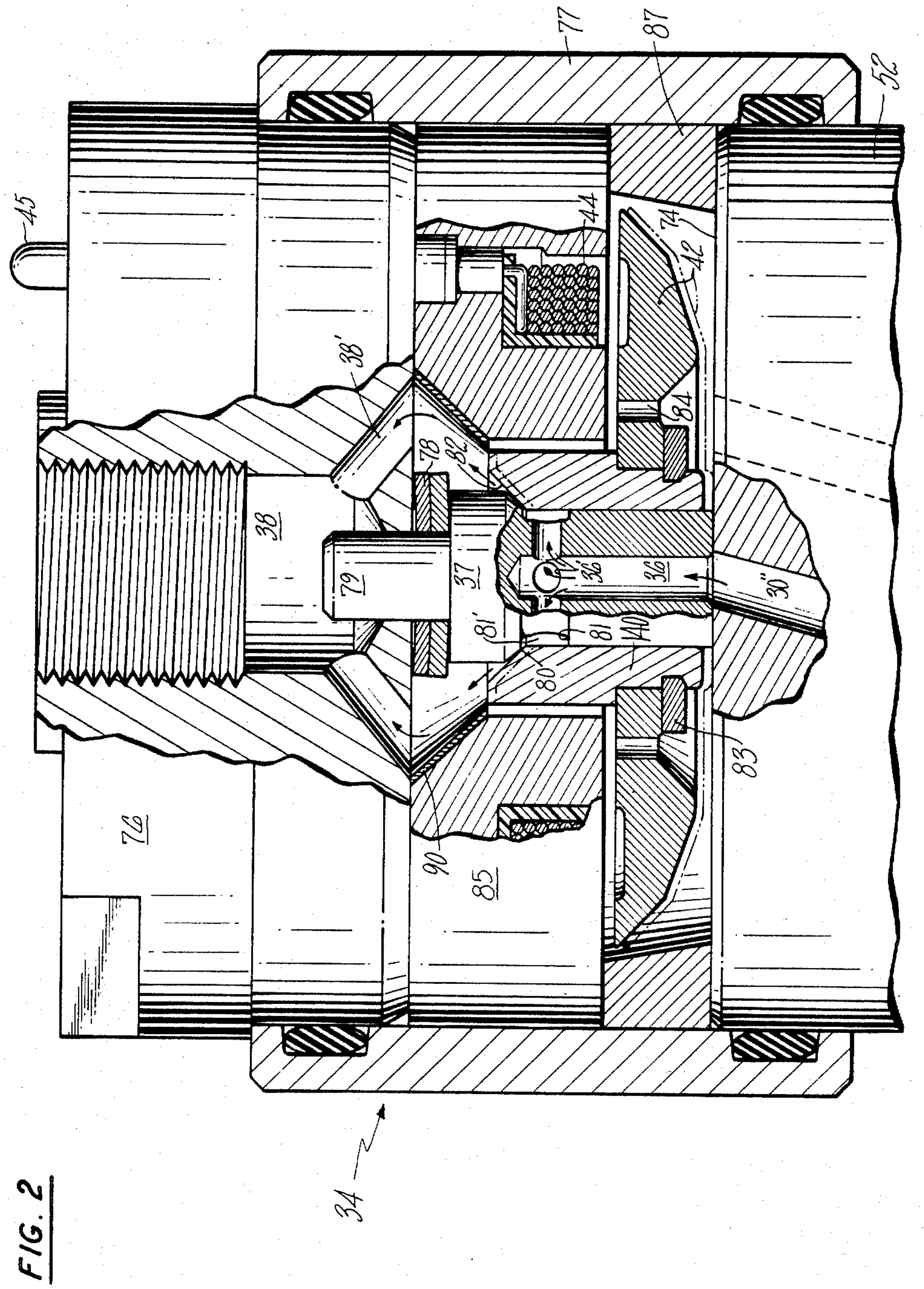
FIG. 2 is an enlarged partial view of FIG. 1 showing the solenoid-actuated valve in greater detail.

As illustrated in FIGS. 1 and 2, conduit extension 30" extends upwardly in nozzle body 52 to an upper surface 74 thereof where it connects with port 36 formed by a blind axial bore in a rod-like valve-seat member or spindle 37 of valve assembly 34. Valve-seat spindle 37 is fixedly positioned within a valve housing cavity formed between the spaced, axially opposing faces of a valve cover 76 and nozzle body 52. A cylindrical collar 77 provides the side wall to the valve housing cavity.

The lower end of valve seat 37 is urged into substantially fluid sealing engagement with the upper surface 74 of nozzle body 52 by means of one or more Belleville washers 78 acting downwardly on a shoulder of valve seat 37 and upwardly on the undersurface of cover 76. The concentric positioning of the valve seat 37 and the retention of the Belleville washers 78 on the valve seat may be assured by a pilot pin 79 extending from the upper end of the valve seat and into a centered bore in the undersurface of cover 76.

The valve-seat spindle 37 has a constant diameter over most of its lower extent and includes a region of larger diameter thereabove. In the region of larger diameter there is formed an annular control edge 80 having a diameter greater than that of the lower spindle portion of the valve seat 37. An annular recess 81 is machined in the valve-seat spindle 37 immediately below the control edge 80, both to form that control edge and to provide a small, high pressure plenum 81' adjacent to the valve seat. One or more radial bores 36' extend inwardly from the recess 81 to the axial port bore 36 to provide liquid communication between the port 36 and the plenum 81'.

In valve assembly 34, the moving valve element is a valve sleeve 140 comprised of a cylindrical sleeve disposed about the lower portion of valve-seat spindle 37 and sized for close axial sliding relation therewith. The inner diameter of the valve sleeve 140 is for most of its length, only slightly larger than the outside diameter of the lower portion of the valve-seat spindle 37 and somewhat less than the diameter of the control edge 80. On the other hand, the outside diameter of the valve sleeve 140 is greater than the diameter of control edge 80, and the transition from the inside diameter to the outside diameter near the upper end includes an upwardly inclined or inverted frustoconical surface 82 for contacting the control edge when the valve is closed. A part of the radially inner surface of sleeve 140 and some of surface 82 cooperate with recess 81 in valve-seat spindle 37 to define the plenum 81'.

An annular armature 42 is joined to the valve sleeve 140 near its lower end, as by snap ring 83. A plurality of bleed holes 84 extend axially through the armature 42 to minimize fluid resistance during actuation.

An annular stator structure 85, including solenoid coil 44, surrounds and is outwardly spaced from the valve sleeve 140. Stator 85 is positioned against the undersurface of cover 76 and is maintained in predetermined spaced relation with the upper surface 74 of the injector body 52 by means of an annular spacer 87. Electrical connection with the coil 44 is by means of a pair of terminals 45.

The amplitude of the stroke of valve sleeve 140 is determined by the contact of its surface 82 with the control edge 80 in the valve-closed position and by contact of the lower end of the sleeve with the upper surface 74 of injector body 52 in the full-open position, as illustrated in broken line in FIG. 2. The axial positioning of the armature 42 on the valve sleeve 140 is preselected such that when the coil 44 is energized and the valve is closed as shown in FIG. 2, there remains a small air gap of approximately 0.004 inch between the armature and the stator 85. The stroke length of valve sleeve 140 determines the air gap spacing when the valve is fully open and, in the present instance, that air gap spacing is about 0.01 inch. Adjustment of the open and closed air gap spacing is made by control of the adjustment of the valve sleeve stroke length and/or the positioning of the armature 42 on valve sleeve 140 and/or the height of spacer 87.

A radially-inner, upper surface of stator 85 is conically beveled and includes a truncated, conical spill deflector 90. The region above spill deflector 90 and below the undersurface of the valve cover 76 defines a low pressure plenum which communicates, via one or more angled bores 38' in the cover, with a large central bore 38 which defines the low pressure drain port associated with the valve.

Referring to FIGS. 3 and 4 in accordance with the invention, FIG. 3 illustrates valve sleeve 140 in its closed position in contact with the control edge 80 of valve-seat spindle 37. FIG. 4 illustrates the valve in its open position with valve sleeve 140, and specifically surface 82 thereof, spaced axially downward from the control edge 80. For purposes of the discussions of FIGS. 3 and 4, various locations on the surfaces of valve spindle 37 and valve sleeve 140 will be designated as "points" and given letter designations, however, it will be appreciated that each of those points represents a circle having a radius about the common centerline or axis of the seat spindle and the sleeve.

Control edge 80 is represented as point D and has a radius $R_D$ from the axis of the seat and sleeve. Frustoconical surface 82 forms an angle $\theta$ with the axis of sleeve 140, typically of about 45°. The point A at which surface 82 intersects the inside diameter of valve sleeve 140 has a radius $R_A$ from the sleeve axis. When valve sleeve 140 is closed, it contacts control edge 80, or point D, at a corresponding point B on frustoconical surface 82. That point B remains in axial alignment with the control edge point D throughout valve operation and possesses a radius $R_B$ from the sleeve axis. The surface 82 is continuous, and indeed linear, from point A to a point C of discontinuity. In the illustrated embodiment, the point of discontinuity C is provided by the intersection of the frustoconical surface 82 with the radially extending end face 82' of the valve sleeve 140.

The surface 95 of valve-seat spindle 37 immediately downstream of the high pressure plenum 81' may also be a frustoconical surface having an angle less than 45° with the axis, e.g., 43°, so as to generally receed from surface 82 in the downstream direction.

The annular flow control orifice formed between control edge 80 and sleeve surface 82 when the valve is open is defined by the shortest distance between point D and the surface 82. That distance is illustrated in FIG. 4 as being along a line DB' normal to the surface 82 and passing through the point D. Referring to FIG. 3 it will be noted that point B' on surface 82 coincides with point B when the valve is closed; however, in FIG. 4 it will be seen that as the valve opens the point B' on surface 82 moves radially outward. Considered in another way, the high pressure hydraulic forces in plenum 81' act axially downward on surface 82 of sleeve 140 for a radial distance that extends from point A to point B', and this radial distance increases as the valve opens.

The valve is normally open and is actuated to its closed position by energization of coil 44. Upon termination of energization of the solenoid, the valve sleeve 140 rapidly opens by virtue of the high pressure hydraulic forces acting axially downward on the axially-facing component of pressure-responsive surface 82 extending from point A to point B'. That axially-facing component is represented by the radial distance between point A and point B'. Examination of FIGS. 3 and 4 shows that if the radial surface area on which the high pressure fluid acts is to continue to increase as valve sleeve 140 moves downward, it is necessary that point B' not move radially outward of discontinuity point C.

The maximum radial value of $R_B$, can be determined if one knows the radius $R_D$ of point D, the angle $\theta$ of surface 82 and the maximum stroke of sleeve 140 when it is full open. The distance DB between points D and B is equal to the stroke of sleeve 140. Thus, $$R_{B'max} = R_D + DB_{max} \sin\theta \cos\theta$$

and must be no greater than $R_C$. In the illustrated embodiment, the radius $R_D$ is 0.125 inch, the stroke, and thus also $DB_{max}$, is about 0.006 inch, the angle $\theta$ of surface 82 is 45° and thus $R_{B'max}$ is about 0.128, which is well within the 0.1775 inch radius $R_C$ to the discontinuity C.

The force acting in the valve opening direction is a product of the average hydraulic pressure and the axially-projected surface area of sleeve 140 on which that pressure operates. As discussed above, the area is represented by the annular band having an inner radius of $R_A$ and an increasing outer radius of $R_{B'}$. The pressure is the average hydraulic pressure in plenum 81' acting on that area. When the valve is closed, the pressure throughout high pressure plenum 81' will be constant, however, as the valve opens and flow begins toward the low pressure region, a pressure gradient will be established as a function of the flow area. With a plenum 81' as configured in FIGS. 1-4, a pressure drop will occur in the plenum as the liquid moves through the narrowing geometry of that plenum as it approaches the control orifice defined between control edge 80 and surface 82.

Referring to FIG. 5, there is illustrated an alternative embodiment of the valve-seat spindle 137 in which the recess 181 machined into the valve-seat spindle 137 includes a portion extending axially upwardly to form a surface 98 which define part of plenum 181'. The surface 98 intersects with surface 95 to form the control edge 80 and is substantially normal to the surface 82 of sleeve 140. The axial extent of surface 98 is sufficient to substantially enlarge plenum 181' in the region of sleeve surface 82 between points A and B'. Such orientation of the surface 98 and resulting depth of plenum 181' aids in reducing or eliminating a pressure drop in the liquid as it begins flowing toward the control edge 80 until the large pressure drop which begins at the control orifice between edge 80 and point B' on surface 82 thereby acting to increase the average pressure acting upon the pressure-sensitive surface.

In view of the foregoing discussion, and assuming hydraulic pressures in the range of 8,000–12,000 psi or more in the height pressure plenum 81' or 181', and pressures of less than 100 psi in the region of low pressure drain port 38, the solenoid-controlled valve embodying the aforedisclosed design is readily capable of actuation to either the open or closed position in less than one millisecond. It will be noted that the rapid response rate in the opening direction is attained without reliance upon mechanical biasing means such as springs or the like, and is attained principally through fluid dynamics with some small assistance by gravity.

Although this invention has been shown and described with respect to detailed embodiments thereof, it will be understood by those skilled in the art that various changes in form and detail thereof may be made without departing from the spirit and scope of the claimed invention. For example, although the invention embodied herein has utilized the surface of a frustrum of right cone as the inclined surface of the valve, it may also be possible to utilize alternative embodiments in which the inclined surface of the valve is contoured to effect even more favorable area versus stroke characteristics.

Having thus described in typical embodiment of my invention, that which is claimed as new and desired to secure by Letters Patent of the United States is:

1. In a valve for controlling the flow of liquid between a high pressure supply and a relatively lower pressure drain, the valve comprising:
   - a stationary valve-seat spindle having a first axial portion of one diameter and a second axial portion of greater diameter, an annular control edge of greater diameter than said first portion being formed on said second portion, said control edge having a radius D from the centerline of said spindle;
   - a cylindrical valve sleeve closely encircling said first portion of said seat spindle in axial sliding relation therewith, said valve sleeve having a pressure-responsive surface and being slideably displaceable between a closed position having part of said pressure-responsive surface thereof in sealing contact with said seat control edge and a fully open position in which said pressure-responsive surface is spaced from said seat control edge axially in the direction of said seat spindle first portion;

the valve-seat spindle including a flow passage having one end operatively connected to the supply of high pressure liquid and the other end discharging to a plenum region formed between said spindle and said sleeve and radially inward of said control edge;

electromagnetic means operatively associated with said valve sleeve for moving said sleeve from said open to said closed position in response to electrical energization; and at least a part of said valve sleeve pressure-responsive surface being substantially a frustrum of a cone having its apex extending in the direction of valve opening, said frustoconical pressure-responsive surface being continuous from its point of contact B with said control edge D when closed to a point C radially outward of point B, point C being radially outward of the centerline of said spindle at least as far as the point of intersection B' with said frustoconical pressure-responsive surface of a line normal to said surface and extending through control edge D when said sleeve is in said fully open position.

2. The valve of claim 1 wherein said valve sleeve frustoconical pressure-responsive surface also includes a portion extending radially inward from said point of contact B to an inner diameter A of said sleeve, said portion of said pressure-responsive surface between points A and B forming a moving wall to said plenum region.

3. The valve of claim 2 wherein said pressure-responsive surface from point B to point C is linear.

4. The valve of claim 3 wherein said pressure-responsive surface from point A to point C is linear.

5. In a valve for controlling the flow of liquid between a high pressure supply and a relatively lower pressure drain, the valve comprising:

a stationary valve-seat spindle having a first axial portion of one diameter and a second axial portion of greater diameter, an annular control edge of greater diameter than said first portion being formed on said second portion, said control edge having a radius D from the axis of said spindle;

a cylindrical valve sleeve closely encircling said first portion of said seat spindle in coaxial sliding relation therewith, said valve sleeve being slideably displaceable between a closed position having a pressure-responsive surface thereof in sealing contact with said seat control edge and a fully open position in which said pressure-responsive surface is spaced from said seat control edge axially in the direction of said seat spindle first portion;

the valve-seat spindle including a flow passage having one end operatively connected to the supply of high pressure liquid and the other end discharging to a plenum region formed between said spindle and said sleeve and radially inward of said control edge;

electromagnetic means operatively associated with said valve sleeve for moving said sleeve from said open to said closed position in response to electrical energization; and at least a major part of said valve sleeve pressure-responsive surface being a frustrum of a right cone having its apex extending in the direction of valve opening and forming an angle $\theta$ with the axis of said sleeve, said frustoconical pressure-responsive surface extending radially outward from point A at an inner diameter of said sleeve to a point C of discontinuity, the radius $R_C$ of point C relative to the axis of said sleeve being equal to or greater than $$R_D + DB_{max} \sin\theta \cos\theta$$

where $R_D$ is the radial distance of control edge D from the axis of said valve sleeve and spindle, which radius is the same as that of a point B on said pressure-responsive surface and which contacts said control edge D when closed, and $DB_{max}$ is the distance axially from control edge D to said point B when said sleeve is in said fully opened position, said parameter $DB_{max}$ corresponding with the stroke of said valve sleeve.

6. The valve of claim 5 wherein said valve is adapted to be connected in fuel bypassing relation with a pressure-responsive fuel injector, said valve being normally open.

7. The valve of claim 5 wherein $\theta$ is approximately 45°, $R_D$ is approximately 0.125 inch and $DB_{max}$ is approximately 0.006 inch whereby $R_C$ is at least about 0.13 inch.

8. The valve of claim 1 wherein said plenum region is structured to minimize any drop in pressure of said liquid passing through said plenum until it reaches a control orifice at which a line normal to said pressure-responsive surface intersects said control edge.

9. The valve of claim 8 wherein a wall portion of said plenum immediately adjacent to said control edge is formed by a surface of said valve-seat spindle extending inwardly of said spindle from said control edge at an angle which is approximately normal to said frustoconical pressure-responsive surface of said valve sleeve.

* * * * *

UNITED STATES PATENT AND TRADEMARK OFFICE
CERTIFICATE OF CORRECTION

PATENT NO. : 4,529,165

DATED : July 16, 1985

INVENTOR(S) : Ronald P.C. Lehrach

It is certified that error appears in the above-identified patent and that said Letters Patent is hereby corrected as shown below:

Column 1, line 57: after "mechanical" change "bising" to "biasing"

Column 2, line 31: after "and" change "is" to "its"

Signed and Sealed this

Sixth Day of January, 1987

*Attest:*

DONALD J. QUIGG

*Attesting Officer*

*Commissioner of Patents and Trademarks*